United States Patent [19]

Ward

[11] Patent Number: 5,080,516

[45] Date of Patent: Jan. 14, 1992

[54] COMPUTER KEYBOARD FUNCTION KEY GUIDE

[75] Inventor: Ridley C. Ward, Sarasota, Fla.

[73] Assignee: Sarasota Technologies, Inc., Sarasota, Fla.

[21] Appl. No.: 369,335

[22] Filed: Jun. 21, 1989

Related U.S. Application Data

[63] Continuation-in-part of Ser. No. 145,054, Jan. 19, 1988, abandoned.

[51] Int. Cl.⁵ .............................................. B41J 29/18
[52] U.S. Cl. ................................... 400/717; 400/719; 40/503; 40/506; 40/661
[58] Field of Search ............... 400/490, 487, 488, 472, 400/473, 477, 479, 479.1, 478.2, 482, 703, 715-719; 40/124.1, 5, 376, 390, 358, 403, 596, 600, 531, 611, 532, 618, 620, 651-653, 493-494, 503, 506-507, 642, 649, 650, 660, 661, 111, 152; 340/365 R, 365 VL; 434/227, 228, 231, 232; 312/252; 341/22-34; 379/355

[56] References Cited

U.S. PATENT DOCUMENTS

| | | | |
|---|---|---|---|
| 183,157 | 10/1876 | Haggerty | 40/506 |
| 463,744 | 11/1891 | Johnston | 40/506 |
| 716,261 | 12/1902 | Merton | 40/503 |
| 1,354,261 | 6/1920 | Mather | 40/506 |
| 1,370,220 | 3/1921 | Miller | 40/111 |
| 1,475,041 | 11/1923 | Alstott | 40/493 |
| 2,782,539 | 2/1957 | Baker | 40/660 |
| 3,008,247 | 11/1961 | Gaumond | 40/506 |
| 3,148,469 | 9/1964 | Umanoff | 40/651 |
| 3,367,049 | 2/1968 | Noreen | 40/649 |
| 3,760,521 | 9/1973 | Barraya | 40/661 |
| 4,123,853 | 11/1978 | Dickensheet | 40/596 |
| 4,275,273 | 6/1981 | Ts'Ao | 340/365 LL X |
| 4,333,097 | 6/1982 | Buric et al. | 340/365 VL X |
| 4,334,219 | 6/1982 | Paulus et al. | 340/365 VL |
| 4,473,963 | 10/1984 | Hardy et al. | 40/651 |
| 4,534,126 | 8/1985 | Gilman | 40/661 |
| 4,637,153 | 1/1987 | Kane et al. | 40/506 |
| 4,663,872 | 3/1987 | Finger | 40/642 |

FOREIGN PATENT DOCUMENTS

| | | | |
|---|---|---|---|
| 548239 | 6/1956 | Belgium | 40/503 |
| 66920 | 5/1948 | Denmark | 40/506 |
| 2922006 | 12/1979 | Fed. Rep. of Germany | 400/472 |
| 1472163 | 1/1967 | France | 40/493 |
| 0128936 | 11/1978 | Japan | 340/365 R |
| 0136246 | 8/1982 | Japan | 340/365 R |
| 0159329 | 10/1982 | Japan | 340/365 R |
| 0044527 | 3/1983 | Japan | 340/365 R |
| 2134293 | 8/1984 | United Kingdom | 340/365 R |
| 2153122 | 8/1985 | United Kingdom | 340/365 R |

OTHER PUBLICATIONS

IBM Technical Disclosure Bulletin "Variable Keyboard for Terminal Displays", vol. 16, No. 2, Jul. 1973, pp. 575-576.

IBM Technical Disclosure Bulletin "Keyboard Identification" vol. 26, No. 7A, Dec. 1983, pp. 3466-3467.

IBM Technical Disclosure Bulletin, "Label Mechanism for Extended Character Set", vol. 26, No. 7B, Dec. 1983, pp. 3904-3905.

IBM Technical Disclosure Bulletin, "Function Key Overlay", vol. 27, No. 7B, Dec. 1984, pp. 4576-4577.

Primary Examiner—Eugene H. Eickholt
Attorney, Agent, or Firm—Reising, Ethington, Barnard, Perry & Milton

[57] ABSTRACT

A computer software key guide holder (10, 110, 210, 310, 410) includes an elongated multi-sided display member (16, 116, 216, 316, 416) within a support member (12, 112, 212, 312, 312) for positioning and retaining atop a computer keyboard (KB). The display member (16, 116, 216, 316, 416) is adapted to receive and display a plurality of software key guides (KG1-n) aligned with the function keys for indicating software functions available by depressing a combination of function keys (F1-12) and control keys (CK1-3). The software key guides (KG1-n) include templates made of thin material and having a plurality of columns (C1-12) associated with each function key and a plurality of rows (R1-4) associated with a control key and intersecting the columns (C1-12) providing individual boxes for marking the function thereon. The rows (R1-2) are of uniform color different from an adjacent row (R1-4) such that each box associated with a particular function key is of a different color.

12 Claims, 4 Drawing Sheets

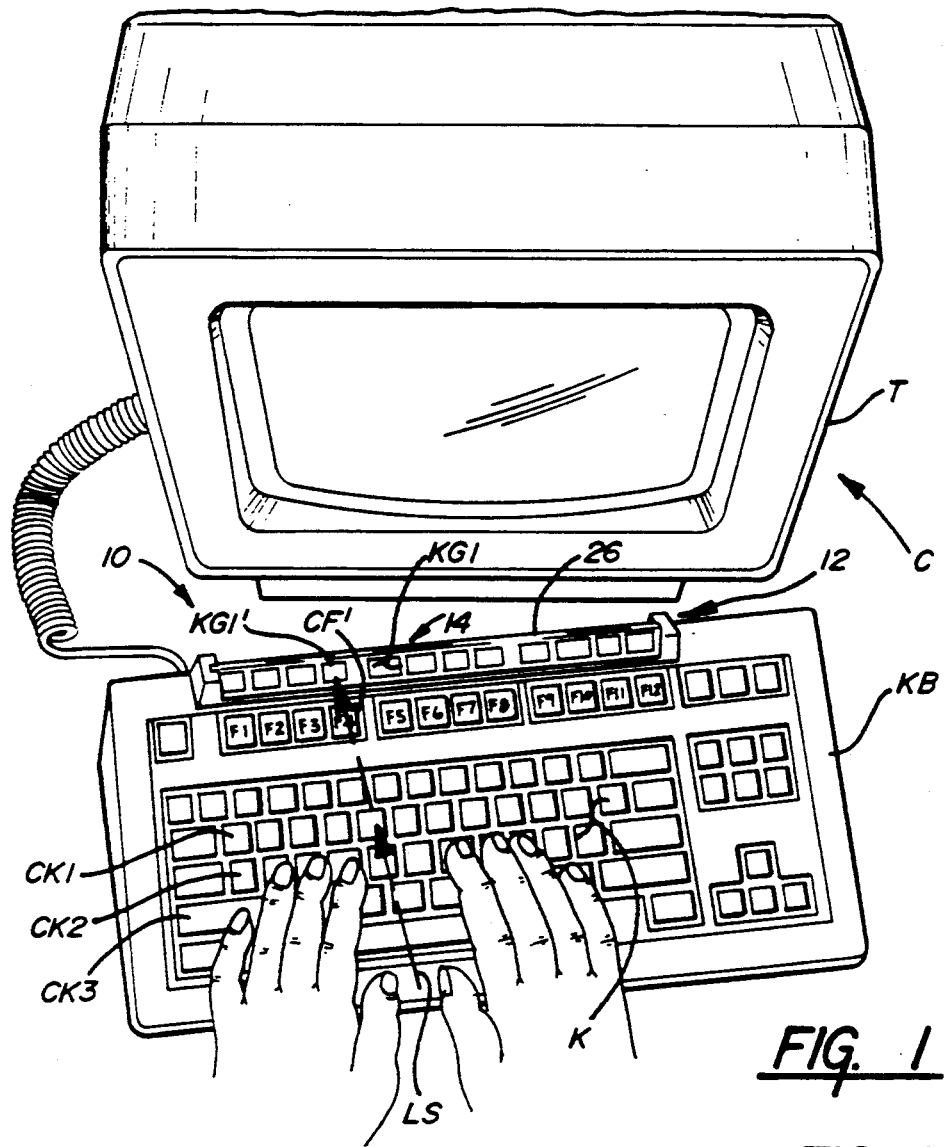
FIG. 1
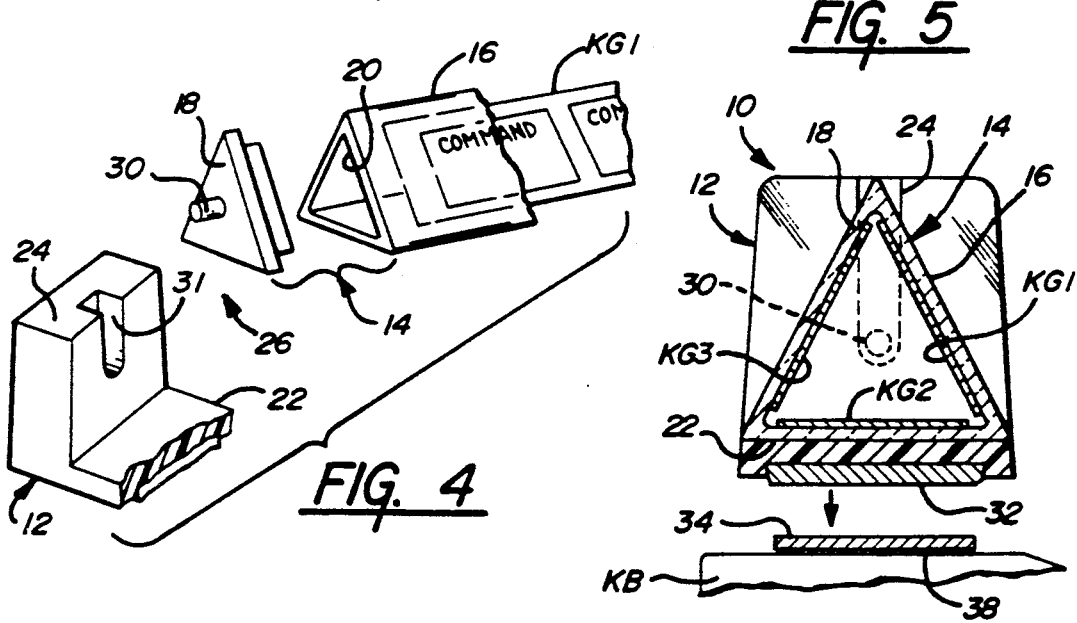
FIG. 4
FIG. 5

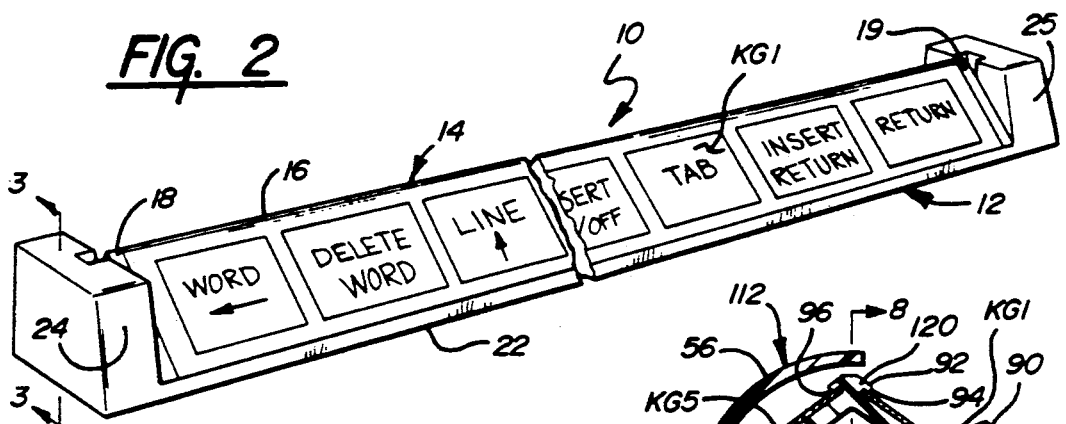
FIG. 2
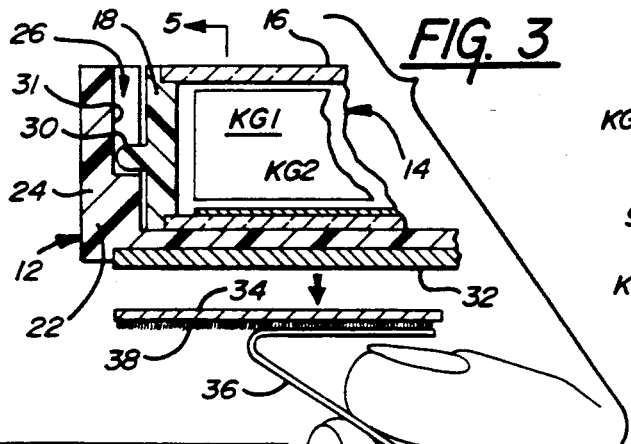
FIG. 3
FIG. 7
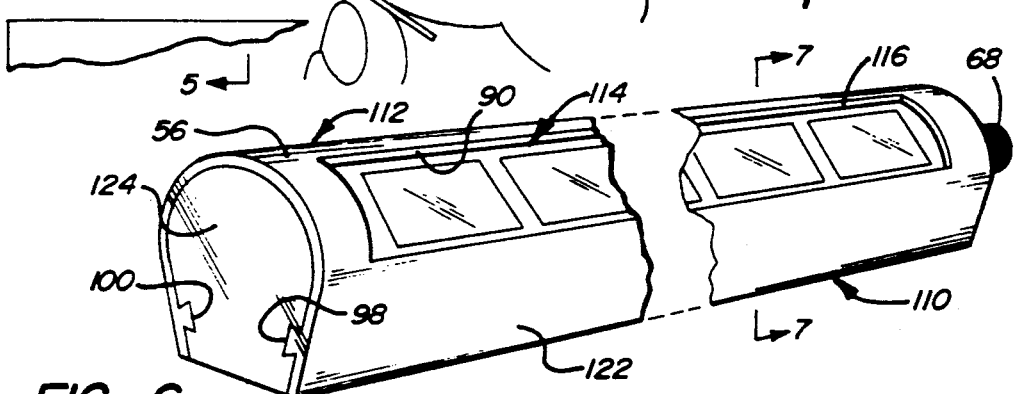
FIG. 6
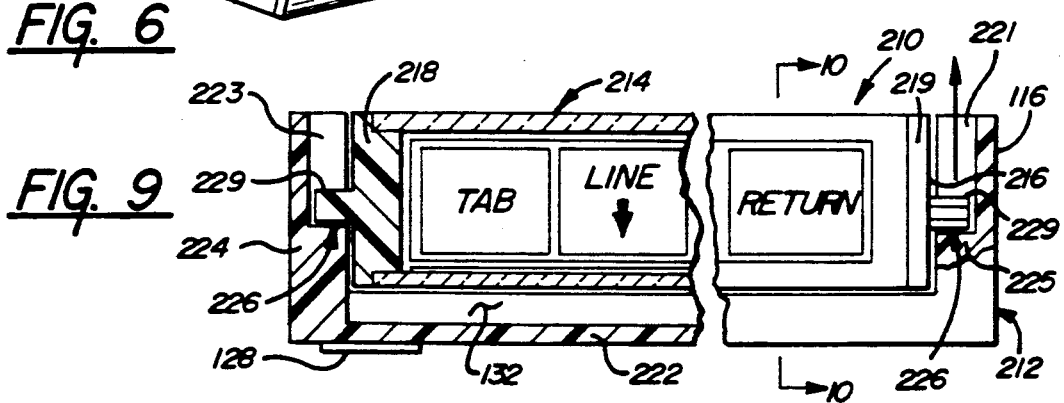
FIG. 9

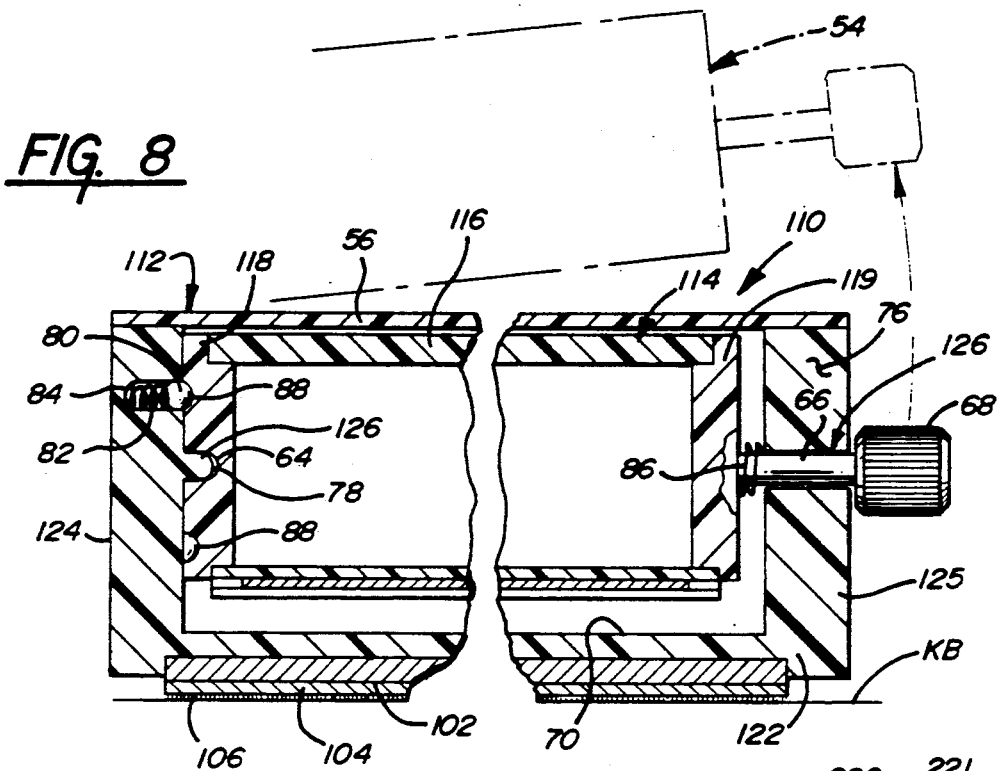

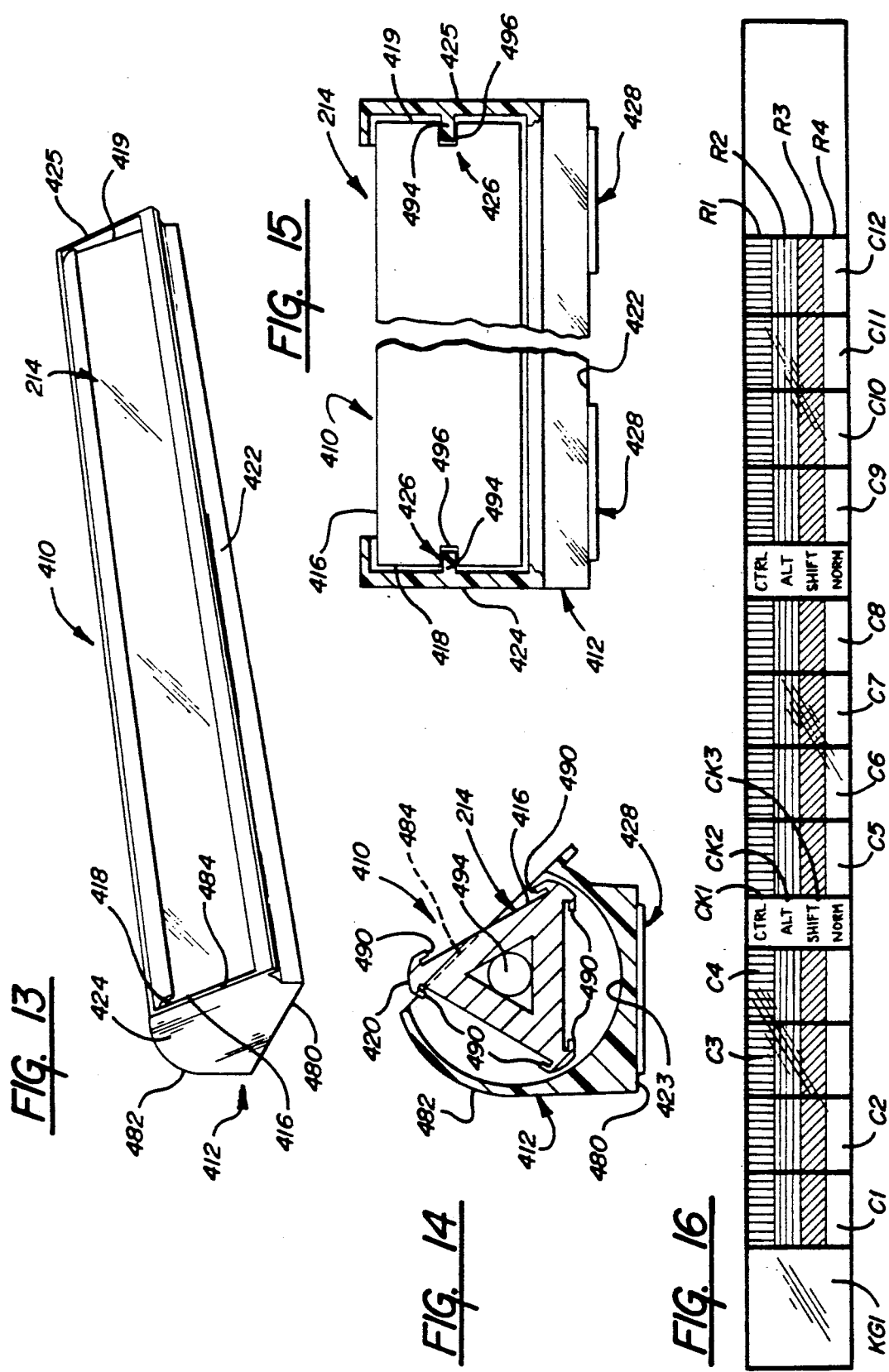

COMPUTER KEYBOARD FUNCTION KEY GUIDE

This application is a continuation in part of patent application, Ser. No. 145,054, filed Jan. 19, 1988, and now abandoned.

TECHNICAL FIELD

The invention relates to a guide for function keys of computer equipment, and more specifically, to a guide identifies different functions obtained by depression of a combination of function keys and control keys.

BACKGROUND OF THE INVENTION

The present invention relates generally to accessories for computer word processing equipment, and more particularly to means for storing and displaying computer software key guides for use in conjunction with the control function keys of the computer keyboards.

With the proliferation of a broad range of computer software programs provided by independent sources in conjunction with modern computer technology is the problem of dealing with the key guides supplied by each computer software manufacturer to instruct the user in the operation of the software. Modern computer keyboards are provided with a plurality of control function keys which are most popularly oriented in a row positioned directly above the normal keyboard keys. The key guides for each software program are generally provided in an elongated strip which may be loosely laid atop the keyboard adjacent these control function keys. These key guides provide directions to the user indicating the particular function within the software logic which each of the keyboard control function keys command. For users utilizing more than on software program, storing, retrieving and positioning these loose key guides becomes burdensome at best. Additionally, normal wear and tear associated with interchanging key guides on a daily bases quickly abuses the physical integrity of these key guides.

Alternately, some software manufacturers provide the key guide in the form of a plurality of rectangularly shaped adhesive sheets or patches sized to be adhered one each atop the control function keys on the keyboard. The problem with such a guide is that only one software program with identified function keys may be used.

IBM Technical Disclosure Bulletin, Vol. 26 No. 7A, December 1983, discloses a label bar to be inserted between the rows of keys and which includes a function identifier on one side. The triangular label bar is designed to fit between the keys and below the surface of the keys. A problem with this type of guide is that only one software function key guide may be applied to each bar, furthermore, such bars are not applicable to all types of keyboards.

IBM Technical Disclosure Bulletin, Vol. 26 No. 7B, December 1983, discloses a label mechanism which utilizes triangular bars situated between the rows of keys and are connected at their ends to a mechanism for rotating the bars. A problem with this type of system is that the mechanism must be installed in the keyboard or is otherwise bulky and awkward.

BRIEF SUMMARY OF THE INVENTION AND ADVANTAGES

The invention is a key guide assembly for identifying functions of control function keys on a keyboard of a computer. The assembly comprises display means comprising a multi-sided tubular member having first and second sides for supporting and displaying software function key guides, holding means for securing the key guides to the display means, support means having a base extending longitudinally along the tubular member and having first and second vertical arms extending from the base, and retainer means interconnecting the first and second ends with the first and second vertical arms for retaining the display means to the support means.

The invention also provides a key guide assembly for identifying functions of control function keys in operation with a control key on the keyboard of a computer. The assembly comprises display means having a plurality of elongated faces and adapted to be aligned with function keys of a keyboard, template means supported by the display means, holding means connected to the display means for securing the template means to the display means, the template means having a plurality of columns associated with each function key and a plurality of rows associated with a control key and intersecting the columns providing individual boxes for marking the function thereon.

The advantages of the invention include providing a computer key guide holder which is an inexpensive adaptable accessory to be adhered to the keyboard of a computer for retaining and displaying a plurality of software key guides each in correct alignment and registry with the computer control function keys. Furthermore, the invention eliminates the necessity of storing software key guides not in use, and reduces and eliminates physical abuse thereto when required for use. The invention allows a broad price and structure complexity range to satisfy both the simple needs of users with a small number of computer software programs as well as the more complex needs of users with a larger number computer software programs and associated key guides and which is more elaborate in physical appearance. Furthermore, the format of the template allows full provision of the functions of a particular function key in combination with control keys associated with many software functions with the ease of a glance.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the subject invention in use atop the keyboard of a computer system;

FIG. 2 is a perspective view of a first embodiment of the subject invention as shown in FIG. 1;

FIG. 3 is a partially broken away cross-sectional view taken along lines 3—3 in FIG. 2;

FIG. 4 is an enlarged exploded perspective view of one end of the invention as shown in FIG. 1;

FIG. 5 is a section view in the direction of arrows 5—5 in FIG. 3;

FIG. 6 is a perspective view of a second embodiment of the subject invention;

FIG. 7 is a cross-sectional view along lines 7—7 in FIG. 6;

FIG. 8 is a cross-sectional view along lines 8—8 in FIG. 7;

FIG. 9 is a partially broken front elevation section view of a third embodiment of the subject invention;

FIG. 10 is a cross-sectional view along lines 10—10 in FIG. 9;

FIG. 11 is a perspective view of the invention as shown in FIG. 9 in an alternate orientation;

FIG. 12 is an enlarged perspective view of one end of a fourth embodiment of the subject invention;

FIG. 13 is a perspective view of a fifth embodiment of the subject invention;

FIG. 14 is a partially cut away view taken along lines 14—14 of FIG. 13;

FIG. 15 is a partially cut away view taken along lines 15—15 of FIG. 13; and

FIG. 16 is an enlarged view of the template.

DESCRIPTION OF THE PREFERRED EMBODIMENT

As generally illustrated in the drawings, the invention is a key guide assembly 10, 110, 210, 310, 410 for identifying functions of control function keys F1-12 in operation with a control key CF1-3 on a keyboard KB of a computer C, which includes a terminal screen T connected as commonly known. The assembly 10, 110, 210, 310, 410 includes display means 14, 114, 214, 314, 414 comprising a multi-sided tubular member 16, 116, 216, 316, 416 having first and second ends 18-9, 118-9, 218-9, 318-9, 418-9. Also included is holding means 20, 120, 220, 320, 420 for attaching the key guides KG1-n to the display means 14, 114, 214, 314, 414 on each side thereof Also included is support means 12, 112, 212, 312, 312 having a base 22, 122, 222, 322, 422 extending along the tubular member 16, 116, 216, 316, 416 and having first and second vertical arms 24-5, 124-5, 224-5, 324-5, 424-5. Retainer means 26, 126, 226, 326, 426 interconnects the first and second ends 18-9, 118-9, 218-9, 318-9, 418-9. With the first and second vertical arms 24-5, 124-5, 224-5, 324-5, 424-5 for retaining the display means 14, 114, 214, 314, 414 in the support means 12, 112, 212, 312, 312. Attachment means 28, 128, 228, 328, 428 is connected to the base 22, 122, 222, 322, 422 for securing the assembly 10, 110, 210, 310, 410 to the keyboard KB.

A modern computer C, particularly one which is IBM/PC compatible, includes a series of control function keys F1-12. These keys are most typically disposed on the keyboard KB above the conventional Arabic and numeral key array K as best shown in FIG. 1 These control function keys F1-12 are arranged in a row and generally carry the indicia of F1 . . . Fn and are provided so that the user may interface with, and control the various command functions within, any given computer software program available. Also, the key board KB includes control keys, generally indicates as CK1-3, and commonly include CNTR, ALT, SHIFT, and NORM indicating no control key CK1-3 need be depressed with the function key F1-12.

The display means 14, 114, 214, 314, 414 supports and displays software function key guides KG1-n, one of which is illustrated in FIG. 16. The function key guides KG1-n include a generally elongated template of paper, cardboard, or the like, extending at least the length of the function keys F1-12 on the keyboard KB. The function key guides KG1-n include columns C1-12 associated with and aligned with each function key CF1-12. The columns C1-12 are to receive various functions names thereon which the function keys CF1-12 will cause to be performed by the software program upon depression thereof. The function key guides KG1-n also includes a plurality of rows R1-4 allowing more than one function to each function key CF1-12. Each row R1-4 intersects the columns C1-C12 providing individual boxes for marking the function thereon. Each row R1-4 is of a color different from adjacent rows R1-4, wherein each box within each column C1-12 is of a different color. The top row R1 is generally red in color, the second row R2 is blue, the third row is green and the fourth row R4 is white. Each box may contain a tunction word identifying the software function when depressed. Each row R1-4 includes a control key label adjacent thereto for identifying the keyboard control key CK1-3 to alternatively be depressed along with the specified function key to obtain the desired function in the box. The control key labels are arranged in column C13 and is marked by CNTR (row R1) marked in red color, ALT (row R2) marked in blue color, SHIFT (row R3) marked in green color which match labels on a standard keyboard, and NORM (row R4) marked in black which indicates function key depression only without a control key. The color of the marked control keys on the template match the color of their respective rows. The more specific format of the template viewing from left to right is four columns C1-4 side by side, then a color less column of the control key labels, then four more columns C5-8 side by side, then a colorless column of the colored control key labels, and then the last four columns C9-C12 side by side. Where individual key guide adhesive patches are provided with the software program, these adhesive patches may be adhered to an elongated, properly sized strip which is then retained within the display member for convenient selection and use vis-a-vis a plurality of other key guides.

In the first embodiment, the display member 14 is fabricated of an elongated transparent triangular sectioned tube 16 and an end plug 18, 19 disposed into each end of the tube 16 as best seen in FIGS. 3 and 4. The dimensions of the tube 16 are such that each elongated strip or template of control function commands embodied in a key guide as provided by the software manufacturer, or as may be fabricated by the user, may be slid within the tube 16 and disposed against one of the inner side surfaces for display which transparent sides also comprise the holding means 20. By this arrangement, then, in the first embodiment, three key guides KG1, KG2 and KG3, as best seen in FIG. 5, may be disposed within and against one side each of the tube 16. Thereafter, the user may view each key guide KG1, KG2 or KG3 through the transparent tube 16 as herebelow described.

The end plugs 18,19, are adapted to snuggly fit and be retained within each end of the hollow tube 16. The end plugs 18,19 include the retainer means 26 comprising support shafts 30 extending outwardly therefrom. The base 22 includes an elongated relatively flat mid-portion and upwardly extending arm portions 24,25. Each arm 24, 25 includes slots 31 respectiVely Which are adapted, in conjunction with the relative lengths of tube 16 and base mid-portion 22, to supportively receive shafts 30 therein. By this arrangement, then, the display member 14 may be downwardly inserted and supportively disposed and retained within base 22 such that each key guide KG1, KG2 and KG3 may be viewable by the user one at a time.

The base 22 is also provided with the attachment means 28. The attachment means 28 is comprised of mating magnetic partial strips 32 and 34. Magnetic strip 32 is adhered to the bottom side of mid-portion 22, while magnetic strip 34 may be adhered by adhesive means 38 which is exposed after peeling media strip 36 therefrom, onto the keyboard KB. The alignment and positioning of the base 22 vis-a-vis the control function key CF is established such that the user's line of sight LS will place the appropriate control function key CF' in viewable registry and alignment with the corresponding software key guide KG1' control command as best seen in FIG. 1. The attachment means 28 may alternatively comprise an adhesive member attached to the base 22 and to be pealed to expose the adhesive also to the keyboard KB, as is generally illustrated in the fifth embodiment 410.

Although the first embodiment of the invention includes a triangular sectioned hollow tube 16 having three equal transparent flat side surfaces, the invention, as will be herebelow described, may include substantially more side surfaces adapted to accomodate users having more than three software programs with associated key guides KG1... KGn. In the first embodiment 10, the display member 14, having the key guides KG1, KG2 and KG3 disposed within the transparent tube 16 as previously described, may simply be lifted from base 22 and slots 31, rotated such that the appropriate key guide KG1, KG2 or KG3 faces the line of sight LS of the user, and then be redisposed within base 12 for use.

Referring to FIGS. 6, 7 and 8, a second embodiment of the invention is shown generally at 110 and also includes display means 114 comprising the multi-sided member 116 with ends 11S, 119, support means 112 with arms 124, 125 and base 122, retainer means 126, holding means 120, and attachment means 128. Installation and removal of the assembly 110 atop the keyboard KB is facilitated, as in the previous embodiment 10, by the retaining means 126 comprising mating magnetic partial strips, partial strip 102 being connected to the bottom surface of the mid-portion of base 122, while mating magnetic strip 104 is connectable onto the keyboard KB by adhesive means 106. By this arrangement of mating magnetic strips 102 and 104, the entire assembly 110 may easily be removed from the keyboard KB for changing or adding key guides then realigned back in the correct position atop the keyboard KB.

The base 122 includes the upwardly extending arms 124, 125 and the display member 114 includes elongated tube 116 having end plugs 118, 119 disposed into each end as shown. In this second embodiment 110, the display member tube 116 has five separate flat side surfaces and includes channel members 92 establishing slots 94 and 96 which opposingly form a mating channel slot to slideably receive and retain one of each key guide KG1 to KG5 disposed therebetween. The tube 116 need not be transparent and may also be tubular or solid because each key guide member KGI to KG5 is disposed on the outer surface of each side of tube 116 for viewing by the user.

The display member 114 is supportively disposed within and between ends 118, 119 and is held thusly for axial rotation. The retainer means 126 comprises a cavity 64 in the first end 118 in mating engagement with shaft 78 extending inwardly from arm 124, and the second end 119 includes a shaft 66 extending inwardly and in mating engagement with a slot 76 in arm 125, as best seen in FIG. 8. By this arrangement, then, the display member 116 may be axially rotated within base 122 without removal therefrom by manipulating a knob 68 connected to the shaft 66 and extending outside the support means 112 and arm 125. A longitudinal concave clearance surface 70 has been provided along the length of mid-portion of base 122 to facilitate rotation of display member 116.

To facilitate quick and consistent reorientation of the display member 116 about its longitudinal axis by the manipulation of knob 68, a detente arrangement is provided by the releasable interengagement of ball 80 in one of five cavities 88 provided in the first end 119. Compression spring 82, disposed in cavity 84 of base arm 125 biases ball 80 into one cavity 88 at a time while compression spring 86, disposed over shaft 66 biases the entire display member 116 to the left as seen in FIG. 8 to enhance this detente function The holding means 120 includes the channels 124 as recited with respect to the second embodiment 110.

Lastly, this embodiment 110 includes the support means 112 comprising a removable shroud or housing 56 formed of a contoured sheet of plastic and having window 90 disposed therethrough The housing 56 releasably interengages around the display member 116 by the dovetail portions 98 and 100 at each end which interengage mating recesses in base arms 124, 125. The window 90 is disposed such that only one key guide KG1, KG2, KG3, KG4 or KG5 may be viewed at a time, the housing 56 being otherwise opaque. The user may thus, by rotating knob 68, select the appropriate key guide KG1, KG2, KG3, KG5 or KG5 to be viewed through window 90.

Referring now to FIGS. 9 and 10, the third embodiment 210 includes display means 214, holding means 220, support means 212, retainer means 226 and the attachment means 228. The display means 214 comprises a three sided triangular sectioned display member 216. The display member 216 is formed of a transparent hollow tubular member 216 similar to that previously described with respect to FIG. 1. However, in this embodiment 210, the retainer means 226 comprises end plugs 218, 219 with hexagonal shafts 229 which mateably engage within slots 221 and 223 in the upwardly extending arms 224, 225 comprising the retainer means 226. The bottom portions of slots 120 and 122 include flats which mateably engage with the flat sides of hexagonal shafts 128 to provide the detente function as previously described with respect to FIG. 6.

In the third embodiment 210, the mid-portion 130 of the base 222 is provided with a longitudinal concave clearance cavity 132 so that the display member may be conveniently axially rotated within base 114 without removal therefrom. However, to remove display member 112 from base 114 to add or replace key guide members, KG1, KG2 or KG3, the display member 112 may be simply lifted completely from slots 120 and 122 in the direction of the arrow.

Referring additionally to FIG. 11 in conjunction with FIGS. 9 and 10, should the user desire a different angular orientation of the facing key guide member KG1, KG2 or KG3 (here shown facing upwardly), the mating hexagonal surfaces between hexagonal shaft 128 and the flattened bottoms of slots 120 and 122 provides for such alternate orientation of the viewable key guide.

Referring lastly to FIG. 12, a fourth embodiment of the invention is shown and includes the display means 314, holding means 320, support means 312, retainer means 326 and attachment means 328. The display means comprises tube 316, as previously described with respect to the first embodiment 10, for receiving and displaying up to three key guides KG1, KG2 and KG3. However, in this embodiment two opposing arms 324, 325 are provided each which include wider slot 42 approximately equal to the width of each side of tube 316. The base 322 and support means 312 includes the attachment means 328 which may be interengaged to the keyboard KB such that tube 316 is disposed adjacent the control function keys CF to effect the proper line of sight LS as previously described with respect to FIG. 1. Thus, tube 316, carrying key guides KG1, KG2 and KG3, may be removed, reoriented and replaced in the direction of the arrows within mating supports 324, 325, one at each end of the tube 316, atop the keyboard KB.

A fifth embodiment of the subject invention is generally indicated at 410 in FIGS. 13–15. The display means 414 comprises a hollow tube or solid three-sided member 416 having first and second ends 418, 419. The retainer means 426 includes opposing channels 490 on each of the sides and extending longitudinally along the display means 214 for receiving the function key guides KG1-n slidingly therein. The channels 490 are configured as those in the second embodiment as indicated in FIGS. 6–8. The channels 490 allow placement of a clear paper-like material, such as a plastic sheet, for inserting over the function key guides KG1-n for protection thereof.

The support means 412 comprises an elongated base 422 having a concave upper surface 423 and substantially flat lower surface for placement on the computer keyboard KB. The support means 412 includes vertical extending arms 425, 426, extending vertically from the base 422, for supporting the display member 416 rotatably over the base 422. In the preferred embodiment 410, the vertical arms 425, 426 include shafts 494 extending inwardly along the base 422, and the elongate display member 416 includes recesses 496 on each end 418, 419 for receiving the shafts 494 allowing the elongate member 416 to rotate about the axis established through the recesses 496 and shafts 494.

The Vertical arms 425, 426 include a flat side 4s0 mating with the flat lower surface of the base 422, and a curved side 482 extending upwardly and vertically from the flatside 480 or base 422 to a point centered above the flat side 480 and extending above the sides of the elongate member 416. A generally sloping and straight side 484 is connected between the curved side 482 and flat side 480 to extend below a side of the elongate member 416 such that when one side of the elongate member 416 is rotated to a position parallel to and between the straight sides 484, the function key guides KG1-n may be slid into and out of the channels 490 of the elongate member 416.

It should be understood that in any of the above described embodiments, the elongate member 16, 116, 216, 316, 416 may be any number of sides, and the shafts and recesses or slots may be interchanged on any embodiment, as may be the channels and transparent sides.

It should be noted that, while a substantial number of software manufacturers provide elongated strips of key guides, nonetheless, where such a strip is not provided, or where the strip is of a different size or dimension form that afforded by the particular tube 26 (FIGS. 1 and 2), 58 (FIG. 6), or 124 (FIG. 9), or where the software manufacturer provides simply a series of adhesive patches to be attached atop the control function keyboard CF individual keys, the user may alternately fabricate a key guide strip which precisely fits within the dimensions of the particular tube 26, 58 or 124.

Also included is a method of preparing the function key guide assembly 10, 110, 210, 310, 410 which includes marking functions in first and second templates boxes, rotating the elongate member to expose a first side, inserting the first template in the holding means, rotating the elongate member to expose a second side, and inserting the second template. Depending on the number of sides of the multi-sided member, the member is rotated that number of times and different templates may be inserted. The housing is attached, either by adhesive or magnetic strips, to the keyboard Alternatively, the templates are attached to the sides by peeling an adhesive and the template is attached thereto.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A key guide assembly for identifying functions of control function keys on a keyboard of a computer, said assembly comprising: display means (14, 114, 214, 314, 414) comprising a multi-sided tubular member (16, 116, 216, 316, 416) having first and second ends (18-9, 118-9, 218-9, 318-9, 418-9) for supporting and displaying software function key guides (KG1-n); holding means (20, 120, 220, 320, 420) for securing the key guides (KG1-n) to said display means (14, 114, 214, 314, 414); support means (12, 112, 212, 312, 412) having a support base (22, 122, 222, 322, 422) extending longitudinally along said tubular member (16, 11, 216, 316, 416) and having first and second vertical arms (24-5, 124-5, 224-5, 324-5, 424-5) extending from said base (22, 122, 222, 322, 422) retainer means (26, 126, 226, 326, 426) interconnecting said first and second ends (18-9, 118-9, 218-9, 318-9, 418-9) with said first and second vertical arms (24-5, 124-5, 224-5, 324-5, 424-5) for retaining said display mens (14, 114, 214, 314, 414) to said support means (12, 112, 212, 312, 412); said vertical arms including an arm base connected with said support base and including a straight side sloping with respect to said base for allowing said tubular member to be rotated to a position with one of said sides of said multi-sided tubular member parallel and generally aligned with said straight side; said retainer means comprising a shaft extendign from one of said ends and said vertical supports and a recess within the other of said ends and said vertical supports, wherein each shaft engages the adjacent recess to retain said display means to said support means; attachment means connected to said base for securing said assembly to the keyboard; and an upper concave surface for allowing said display means to rotate in said support means and a lower flat surface for placement on a keyboard.

2. An assembly as set forth in claim 1 further characterized by said holding means comprising a pair of oppositely opposing channel members extending longitudinally along each side of said elongate member to receive the function key guides therebetween.

3. An assembly as set forth in claim 2 further characterized by said attachment means comprising adhesive member attached to said base and adapted to be attached to the keyboard.

4. An assembly as set forth in claim 2 further characterized by said shafts extending toward one another from said vertical arms and said recesses extending into said ends of said elongate member for rotatably receiving said shafts.

5. An assembly as set forth in claim 4 further characterized by the key guides comprising a template having a plurality of columns associated with each function key and a plurality of rows associated with a control key and intersecting said columns providing individual boxes for marking the function thereon.

6. An assembly as set forth in claim 2 further characterized by said shafts extending outwardly from said ends of said elongate member and said recesses extending within said vertical arms for engagement of said shafts therein.

7. An assembly as set forth in claim 6 further characterized by the key guides comprising a template having a plurality of columns associated with each function key and a plurality of rows associated with a control key and intersecting said columns providing individual boxes for marking the function thereon.

8. A key guide assembly for identifying functions of control function keys in operation with a control key on the keyboard of a computer, said assembly comprising; display means having a plurality of elongated faces and adapted to be aligned with function keys of a keyboard, template means supported by said display means, holding means connected to said display means for securing said template means to said display means, said template means having a plurality of columns associated with each function key and a plurality of rows associated with a control key and intersecting said columns providing individual boxes for marking the function thereon.

9. An assembly as set forth in claim 8 further characterized by said rows being of a uniform color different from an adjacent row such that each box associated with a particular function key is of a different color.

10. An assembly as set forth in claim 9 further characterized by the associated control key being marked adjacent the respective row.

11. An assembly as set forth in claim 10 further characterized by said plurality of columns comprising twelve columns.

12. An assembly as set forth in claim 11 further characterized by said plurality of rows comprising four rows.

* * * * *